US011277326B2

(12) United States Patent
Bannister et al.

(10) Patent No.: US 11,277,326 B2
(45) Date of Patent: Mar. 15, 2022

(54) TECHNIQUES FOR DETECTING CHANGES TO CIRCUIT DELAYS IN TELECOMMUNICATIONS NETWORKS

(71) Applicant: NETFLIX, INC., Los Gatos, CA (US)

(72) Inventors: David Bannister, Gainsville, VA (US); Rafael Rodriguez, Miami, FL (US)

(73) Assignee: NETFLIX, INC., Los Gatos, CA (US)

( * ) Notice: Subject to any disclaimer, the term of this patent is extended or adjusted under 35 U.S.C. 154(b) by 39 days.

(21) Appl. No.: 16/836,505

(22) Filed: Mar. 31, 2020

(65) Prior Publication Data
US 2021/0306245 A1    Sep. 30, 2021

(51) Int. Cl.
*H04L 12/26* (2006.01)
*H04B 10/27* (2013.01)
*H04L 12/24* (2006.01)
*H04L 29/06* (2006.01)
*H04L 43/0864* (2022.01)
(Continued)

(52) U.S. Cl.
CPC ......... *H04L 43/0864* (2013.01); *H04B 10/27* (2013.01); *H04L 41/06* (2013.01); *H04L 43/10* (2013.01); *H04L 69/16* (2013.01)

(58) Field of Classification Search
CPC ..... H04L 43/0864; H04L 41/06; H04L 43/10; H04L 69/16; H04L 41/142; H04L 41/147; H04L 43/0852; H04B 10/27
See application file for complete search history.

(56) References Cited

U.S. PATENT DOCUMENTS

| 6,445,681 B1* | 9/2002 | Pogrebinsky ......... H04J 3/0682 370/229 |
| 10,602,383 B1* | 3/2020 | Horton .................. H04L 41/142 |

(Continued)

FOREIGN PATENT DOCUMENTS

| CN | 107682235 A | 2/2018 | |
| KR | 20110077329 A | 7/2011 | |
| WO | WO-2011104620 A1 * | 9/2011 | ......... H04L 43/0864 |

OTHER PUBLICATIONS

International Search Report for Application No. PCT/US2021/020290, dated May 18, 2021, 37 pages.

(Continued)

*Primary Examiner* — Javier O Guzman
(74) *Attorney, Agent, or Firm* — Artegis Law Group, LLP

(57) ABSTRACT

In various embodiments, a monitoring application assesses delays associated with a circuit within a network. The monitoring application determines a measured trip time between a first device and a second device that is connected to the first device via the circuit. The measured trip time is associated with a first variance attributable to the first device. The monitoring application performs one or more digital signal processing operations based on the measured trip time to generate a predicted trip time. The predicted trip time is associated with a second variance attributable to the first device that is less than the first variance. Based on the predicted trip time, the monitoring application determines characteristic(s) of the delay associated with the circuit. Advantageously, reducing variations attributable to the first device when generating the first predicted trip time increases the accuracy with which the monitoring application can determine the characteristic(s) of the delay.

20 Claims, 3 Drawing Sheets

(51) Int. Cl.
  *H04L 41/06* (2022.01)
  *H04L 43/10* (2022.01)
  *H04L 69/16* (2022.01)

(56) References Cited

U.S. PATENT DOCUMENTS

| | | | | |
|---|---|---|---|---|
| 10,638,400 | B1* | 4/2020 | Xu | H04L 45/12 |
| 10,742,555 | B1* | 8/2020 | Shalev | H04L 45/26 |
| 2002/0089930 | A1* | 7/2002 | Aceves | H04L 47/14 |
| | | | | 370/230 |
| 2003/0190040 | A1 | 10/2003 | Tegethoff | |
| 2005/0025090 | A1* | 2/2005 | Klein | H04W 28/10 |
| | | | | 370/328 |
| 2005/0265321 | A1* | 12/2005 | Rappaport | H04W 16/20 |
| | | | | 370/352 |
| 2006/0153089 | A1* | 7/2006 | Silverman | H04L 41/145 |
| | | | | 370/252 |
| 2006/0176824 | A1* | 8/2006 | Laver | H04L 43/08 |
| | | | | 370/241 |
| 2007/0217343 | A1* | 9/2007 | Znamova | H04L 41/00 |
| | | | | 370/252 |
| 2012/0307675 | A1* | 12/2012 | Lusilao-Zodi | H04L 43/0864 |
| | | | | 370/252 |
| 2012/0327789 | A1* | 12/2012 | Grenier | H04L 43/10 |
| | | | | 370/252 |
| 2013/0054783 | A1* | 2/2013 | Ge | H04L 43/0823 |
| | | | | 709/224 |
| 2013/0267257 | A1* | 10/2013 | Palanki | H04W 64/003 |
| | | | | 455/456.5 |
| 2014/0194137 | A1* | 7/2014 | Do | G01S 5/0252 |
| | | | | 455/456.1 |
| 2016/0202074 | A1* | 7/2016 | Woodard | G01C 21/34 |
| | | | | 701/465 |
| 2018/0227349 | A1* | 8/2018 | Annamraju | H04L 65/80 |
| 2019/0356984 | A1* | 11/2019 | Anemuller | H04R 3/04 |
| 2019/0394137 | A1* | 12/2019 | Zeng | H04L 47/11 |
| 2020/0052974 | A1 | 2/2020 | Yasuda | |
| 2020/0287976 | A1* | 9/2020 | Theogaraj | H04L 43/0864 |

OTHER PUBLICATIONS

Yang et al., "Predicting Internet End-to-End Delay: A Statistical Study", Annual Review of Communications, National Engineering Consortium, vol. 58, XP001520536, ISSN: 0886-229X, Jan. 1, 2005, pp. 665-677.

Zhang et al., "Concurrent Multipath Transfer Performance Optimization Using Kalman Filter Based Predictive Delay Estimation In Wireless Networks", Global Information Infrastructure Symposium (GIIS), IEEE, XP031940928, DOI: 10.1109/GIIS.2011.6026701, ISBN: 978-1-4577-1262-3, Aug. 4, 2011, 5 pages.

* cited by examiner

TECHNIQUES FOR DETECTING CHANGES TO CIRCUIT DELAYS IN TELECOMMUNICATIONS NETWORKS

BACKGROUND

Field of the Various Embodiments

The various embodiments relate generally to computer networking and, more specifically, to techniques for detecting changes to circuit delays within telecommunications networks.

Description of the Related Art

Understanding the transmission delays associated with the physical paths or "circuits" within a telecommunications network is oftentimes an important aspect of effectively using the telecommunications network. Initially, users typically can determine the delays associated with various circuits based on physical lengths that are provided by telecommunication providers. However, telecommunications providers rarely inform users of changes made to circuits that can negatively impact the delays associated with those circuits, such as when a given circuit is re-routed. To maintain an up-to-date understanding of a telecommunications network, some users attempt to detect and understand any changes in the delays associated with the circuits in the telecommunications network on an ongoing basis.

In one approach to understanding the delays associated with circuits, a user executes ping commands via a ping software utility. When a ping command is executed on one device on a network, the ping command transmits a message to another, specified device on the network and measures the round trip time ("RTT") that elapses between when the message is transmitted and when a response message is received back from the specified device. Some examples of devices include, without limitation, routers, smartphones, and laptops, to name a few. The user repeatedly executes ping commands that measure the RTTs between various devices within the network and then tracks the RTTs over time to identify any changes in the RTTs that could indicate a change in the network that causes a change in the delays associated with the circuits in the network. To determine the delay associated with a given circuit, the user can attempt to distinguish between the contribution of the circuit and the contribution of the devices to the associated RTTs.

One drawback of using RTTs is that the devices introduce variable delays that relate to scheduling and transmitting messages. For a circuit that is less than approximately fifty kilometers in length, the relatively high contribution of the variable delays to the RTTs attributable to the devices on either end of the circuit or "endpoints" makes determining the contribution of the circuit itself to the RTTs quite difficult. Consequently, the accuracy with which the delays associated with such a circuit and any changes in the delays associated with such a circuit can be determined can be substantially reduced.

In another approach to understanding the delays associated with circuits, dedicated hardware probes can be deployed at the endpoints of the circuits to form a mesh across the associated telecommunications network. The dedicated hardware probes can then be used to detect changes in the delays associated with the circuits within the mesh as well as the actual delays themselves. One drawback associated with using dedicated hardware probes is that most telecommunications providers rarely (if ever) allow users to deploy dedicated hardware probes at endpoints that are located within telecommunications facilities. Consequently, users can deploy dedicated hardware probes only at endpoints within their own facilities, which substantially reduces the efficacy of this approach.

As the foregoing illustrates, what is needed in the art are more effective techniques for understanding the delays associated with the circuits within a telecommunications network.

SUMMARY

One embodiment of the present invention sets forth a computer-implemented method for assessing delays associated with a circuit included in a network. The method includes determining a measured trip time between a first device within the network and a second device within the network, where the first device is connected to the second device via the circuit, and where the measured trip time is associated with a first variance attributable to the first device; performing one or more digital signal processing operations based on the measured trip time to generate a first predicted trip time that is associated with a second variance attributable to the first device, wherein the second variance is less than the first variance; and determining at least one characteristic of a delay associated with the circuit based on the first predicted trip time.

At least one technical advantage of the disclosed techniques relative to the prior art is that the disclosed techniques can be used to accurately determine the delays associated with a circuit within a telecommunications network and/or detect changes in the delays associated with that circuit irrespective of the length of the circuit or the locations of the endpoints of the circuit. Among other things, in the disclosed techniques, variations in measured trip times that are not attributable to the circuit, itself, are automatically accounted for, which enables any changes in the timing of the actual circuit to be detected accurately. Further, unlike delay measurement techniques that involve dedicated hardware probes, the disclosed techniques can be used to accurately determine the delays associated with a given circuit and/or detect changes in the delays associated with that circuit without physically accessing the endpoints of the circuit. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
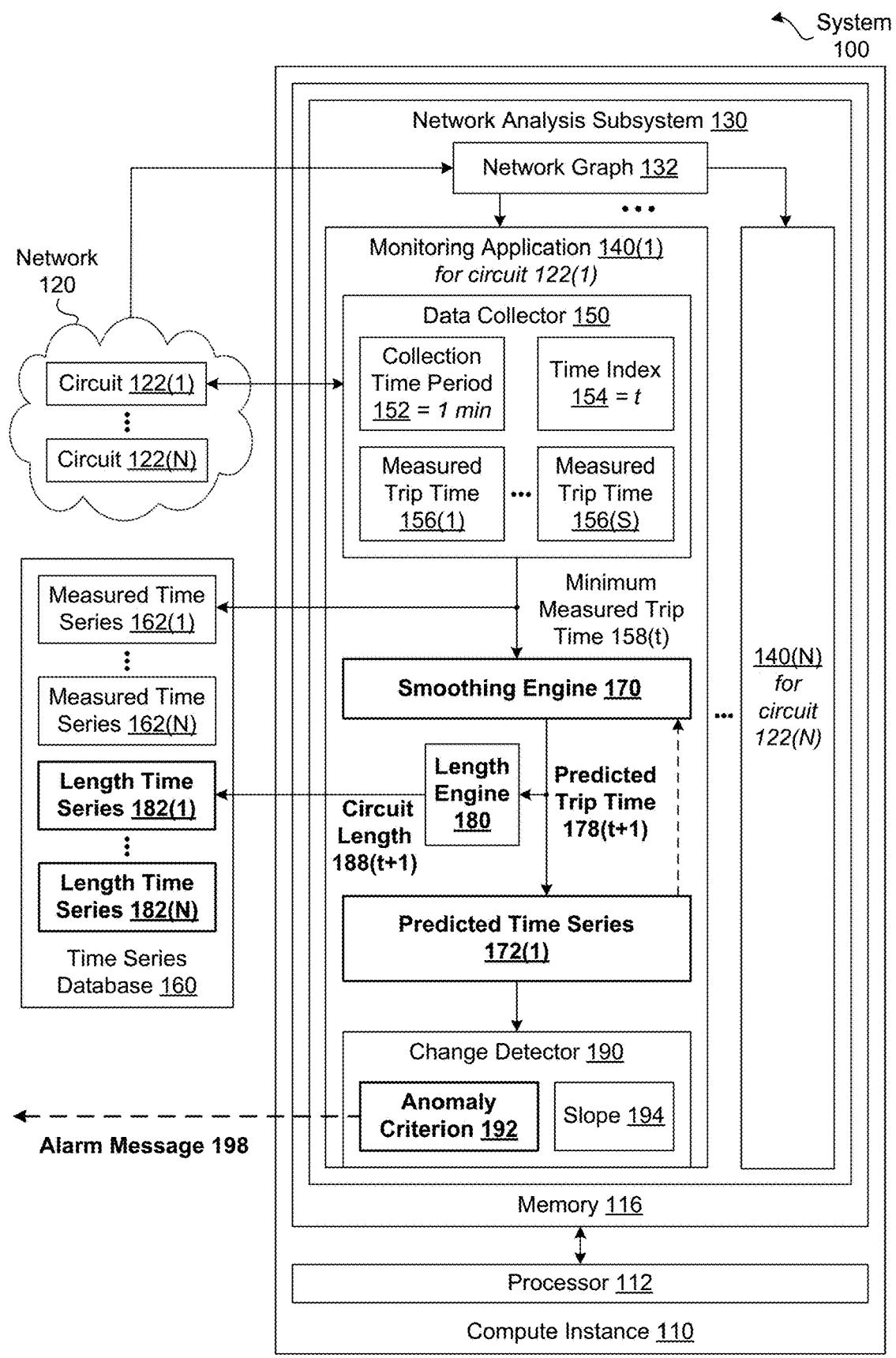
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

Typically, when a user purchases a circuit from a telecommunications provider, the telecommunications provider provides physical path information that allows the user to understand various routing-related characteristics of the circuit. In particular, the user can compute the delay associated with propagating data through the circuit. The user can then use the physical path information of the circuit along with the physical path information of any number of other circuits in the same telecommunications network to optimize their usage of the telecommunications network. However, if the telecommunications provider subsequently re-routes or makes other physical path changes to the circuit, the telecommunications provider usually does not inform the user. To maintain an up-to-date understanding of the telecommunications network, some users attempt to detect and understand any changes to the delays associated with the circuits in the telecommunications network on an ongoing basis.

In one prior art approach to understanding the delays associated with circuits, a user executes ping commands via a ping software utility. Each ping command measures the RTT that elapses between when a request message is transmitted from a source device to a destination device and when a response message is received back from the destination device. The user compares the various RTTs to identify any changes in the RTTs that could indicate a change in the network that causes a change in the delays associated with the circuits in the network.

One drawback of relying on differences in RTTs to identify changes in the delays associated with the circuits is that the devices on either end of each circuit or "endpoints" of the circuit introduce variable delays that relate to scheduling and transmitting messages. For a circuit that is less than approximately fifty kilometers in length, the relatively high contribution of these variable delays to the RTTs can mask any change in the contribution of the circuit itself to the RTTs. For example, during a one day time period, the contributions of the endpoints to the RTTs measured for a 28 kilometers long fiber optic cable could vary between 0.073 and 3.153 milliseconds, while the contribution to the RTTs from the cable itself could be 0.294 milliseconds In another prior art approach to understanding the delays associated with circuits, the user can deploy dedicated hardware probes at the endpoints of the circuits to form a mesh across the associated telecommunications network. The dedicated hardware probes can then be used to detect changes in the delays associated with the circuits within the mesh as well as the actual delays themselves. One drawback associated with using dedicated hardware probes is that a typical user is unable to physically access many of the devices on the telecommunications network and therefore the user cannot deploy dedicated hardware probes at the endpoints of many circuits.

With the disclosed techniques, however, a monitoring application can accurately detect changes in the delay associated with a circuit, compute the delay associated with the circuit, and/or determine the length of the circuit. In some embodiments, the monitoring application repeatedly executes a collection process that spans a collection time period (e.g., one minute). During each collection process, the monitoring application issues multiple ping commands to determine measured trip times (e.g., RTTs) associated with two endpoints of the circuit. The monitoring application then inputs the minimum of the measured trip times into a Kalman filter that, in response, computes a predicted trip time for the next collection time period. Notably, the Kalman filter is configured to recursively reduce or "filter-out" the variances associated with the endpoints over time. After the delay associated with the circuit is stable for a certain length of time (e.g., twenty minutes), the predicted trip times converge to an approximately constant time.

After generating each predicted trip time, the monitoring application analyzes the predicted trip time in conjunction with any number of the previously generated predicted trip times to detect any changes in the delay associated with the circuit. For example, if all the predicted trip times for 9:00 to 9:10 AM are at least 0.25 milliseconds higher than all the predicted trip times for 8:00 to 9:00 AM, then the monitoring application could determine that the delay associated with the circuit has increased. If the monitoring application detects a change in the delay associated with the circuit, then the monitoring application transmits an alarm message to any number of software applications. Optionally, the monitoring application computes the delay associated with the circuit and/or the length of the circuit based on the predicted trip times.

At least one technical advantage of the disclosed techniques relative to the prior art is that the monitoring application automatically filter-outs variations in measured trip times that are not attributable to the circuit itself prior to assessing the circuit. Consequently, unlike prior-art techniques that use the ping software utility, the monitoring application can accurately determine the delays associated with the circuit irrespective of the length of the circuit. Furthermore, because the monitoring application uses existing software applications (e.g., the ping software utility) to measure timing data associated with the circuit instead of dedicated hardware probes, the monitoring application can be used to assess the circuit without physically accessing the endpoints of the circuit. These technical advantages provide one or more technological advancements over prior art approaches.

System Overview

FIG. 1 is a conceptual illustration of a system 100 configured to implement one or more aspects of the various embodiments. As shown, the system 100 includes, without limitation, a compute instance 110, a network 120, and a time series database 160. For explanatory purposes, multiple instances of like objects are denoted with reference numbers identifying the object and parenthetical alphanumeric character(s) identifying the instance where needed.

Any number of the components of the system 100 may be distributed across multiple geographic locations or implemented in one or more cloud computing environments (i.e., encapsulated shared resources, software, data, etc.) in any combination. In alternate embodiments, the system 100 may include any number of compute instances 110. Each compute instance 110 may be implemented in a cloud computing environment, implemented as part of any other distributed computing environment, or implemented in a stand-alone fashion.

As shown, the compute instance 110 includes, without limitation, a processor 112 and a memory 116. The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In some alternate embodiments, any number of the compute instances 110 (including one) may provide a multiprocessing environment in any technically feasible fashion.

The memory 116 may be one or more of a readily available memory, such as random access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each compute instance 110 is configured to implement one or more applications or subsystems of applications. For explanatory purposes only, each application is described as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to automatically assess delays associated with circuits 122(1)-122(N), where N is a positive integer, included in the network 120. The network 120 may be any type of telecommunications network. The delay associated with the circuit 122(x), where x is any integer between 1 and N, is also referred to herein as a "circuit delay." Each of the circuits 122 is a physical path (e.g., fiber optic cable, twisted pair cable, coaxial cable, etc.) that connects, without limitation, two or more endpoints (not shown). Each endpoint of the circuit 122 is a device that is capable of transmitting and/or receiving data via the circuit 122. Some examples of endpoints include, without limitation, routers, smartphones, game consoles, smart televisions, etc.

As described previously herein, in one conventional approach to understanding circuit delays, a user determines circuit delays and/or changes in the circuit delays based on RTTs obtained via the ping software utility, One drawback of assessing circuits that are less than approximately fifty kilometers in length via the RTTs is that variable delays introduced by the endpoints can substantially reduce the accuracy with which the circuit delays and changes to the circuit delays can be determined. In another conventional approach to understanding circuit delays, a user measures the circuit delays via dedicated hardware probes that are deployed at the endpoints of the circuits. One drawback associated with using dedicated hardware probes is that a typical user can deploy dedicated hardware probes only at endpoints within their own facilities and can therefore only assess a subset of circuits using this approach.

Assessing Circuits Based on Filtered Trip Times

To address the above problems, the system 100 includes, without limitation, a network analysis subsystem 130 that automatically reduces variances in trip times attributable to endpoints while assessing the circuits 122 over time. As referred to herein, a trip time may be any type of delay that is associated with exchanging data between two devices via the network 120. For instance, in some embodiments, a trip time refers to a one way trip time between the two endpoints of one of the circuits 122. In other embodiments, a trip time refers to an RTT between the two endpoints of one of the circuits 122.

The network analysis subsystem 130 resides in the memory 116 and executes on the processor 112 of the compute instance 110. In alternate embodiments, the functionality of the network analysis subsystem 130 may be distributed across any number of applications and/or subsystems that execute on any number of compute instances 110 and/or any number of processors 112 in any combination. As shown, the network analysis subsystem 130 includes, without limitation, a network graph 132 and monitoring applications 140(1)-140(N).

The network graph 132 represents the topology of the network 120 and includes, without limitation, any number of vertices (not shown) and any number of edges (not shown). Each edge in the network graph 132 connects two or more of the vertices in the network graph 132. The vertices represent the endpoints associated with the network 120 and the edges represent the circuits 122 included in the network 120. The network analysis subsystem 130 may generate the network graph 132 in any technically feasible fashion.

For instance, in one or more embodiments, the network analysis subsystem 130 generate the network graph 132 based on a combination of online and/or offline network data. In one or more embodiments, the network analysis subsystem 130 obtains network data at the data link layer of the Open Systems Interconnection ("OSI") model via any number of the Link Layer Discovery Protocol, the Cisco Discovery Protocol, the Address Resolution Protocol, and/or static Layer 2 assignments. In the same or other embodiments, the network analysis subsystem 130 determines network data at the network layer of the OSI model from a network link state database, such as the Intermediate System to Intermediate System (ISIS) or Open Shortest Path First Link State Database. Based on the network data at the network layer, the network analysis subsystem 130 generates the vertices and edges of the network graph 132.

In one or more embodiments, the network analysis subsystem 130 acquires Border Gateway Protocol ("BGP") neighbor adjacencies online and/or offline and adds associated relevant data to the vertices of the network graph 132. In the same or other embodiments, the network analysis subsystem 130 acquires offline data from a circuit database (not shown) and overlays relevant data (e.g., circuit identifiers, expected bandwidths, lengths, delays, etc.) onto the edges of the network graph 132.

After generating the network graph 132, the network analysis subsystem 130 causes the monitoring applications 140(1)-140(N) to monitor the circuits 122(1)-122(N), respectively. Each of the monitoring applications 140(1)-140(N) is a different instance of a single software application that is also referred to herein as "the monitoring application 140." For explanatory purposes only, the components and the operation of the monitoring application 140 are described in detail below in the context of the monitoring application 140(1). In alternate embodiments, the network analysis subsystem 130 may monitor M of the circuits 122 included in the network 120, where M is between one and N, via M instances of the monitoring application 140. As shown for the monitoring application 140(1), the monitoring application 140 includes, without limitation, a data collector 150, a smoothing engine 170, a length engine 180, and a change detector 190.

The data collector 150 includes, without limitation, a collection time period 152, a time index 154, and measured trip times 156(1)-156(S), where S may be any positive integer. In operation, the data collector 150 determines two endpoints of the circuit 122 based on the network graph 132. Subsequently, the data collector 150 repeatedly executes a collection process that gathers timing data associated with the two endpoints over the collection time period 152 (e.g., one minute). The time index 154 identifies the current execution of the collection process and is therefore associated with a time or timestamp. Initially, the data collector 150 sets the time index 154 equal to one to indicate that the data collector 150 is currently executing the first collection process. The data collector 150 increments the time index 154 after completing each collection process. For explanatory purposes only, the current collection process is denoted as the time index 154 of "t."

During each current collection process, the data collector 150 determines the measured trip times 156(1)-156(S) at approximately equally spaced intervals. For example, if the collection time period 152 is equal to one minute and S is equal to 6, then the data collector 150 determines the measured trip times 156(1)-156(6) ten seconds, twenty seconds, thirty seconds, forty seconds, fifty seconds, and sixty seconds, respectively, after the start of the collection process.

As outlined previously herein, each of the endpoints introduces additional, variable delays related to scheduling and transmitting messages to the measured trip times 156. As persons skilled in the art will recognize, when the circuit 122 is unchanged, the differences in the measured trip times 156(1)-156(6) are attributable to the additional variable delays introduced by the endpoints. To reduce the variable delays attributable to the endpoints, at the end of the current collection process, the data collector 150 sets the minimum measured trip time 158(t) equal to the minimum of the measured trip times 156(1)-156(6).

The measured trip times 156 and the minimum measured trip times 158 may correspond to any type of trip times associated with exchanging data between two endpoints via the circuit 122(1). For instance, in some embodiments, the measured trip times 156 and the minimum measured trip times 158 correspond to RTTs between the two endpoints via the circuit 122(1). In other embodiments, the measured trip times 156 and the minimum measured trip times 158 correspond to one way trip times between two endpoints via the circuit 122(1).

The data collector 150 may determine the measured trip times 156 in any technically feasible fashion. For instance, in some embodiments, the data collector 150 executes ping commands via an instance of the Ping tool executing on one of the endpoints. To measure each of the measured trip times 156, the data collector executes a ping command that specifies the other endpoint as the destination endpoint. The Ping tool sends a message to the destination endpoint via the circuit 122 and measures the RTT that elapses before receiving a response message from the destination endpoint. The data collector 150 then sets the measured trip time 156 equal to the measured RTT.

In other embodiments, the data collector 150 determines the measured trip times 156 based the Transmission Control Protocol ("TCP") Transmission Control Block ("TCB") associated with the circuit 122(1). As persons skilled in the art will recognize, the TCB is a data stricture that includes, without limitation, an RTT for the associated circuit 122(1). The TCB is available to any to point communications mechanism based on TCP, such as Border Gateway Protocol, Label Distribution Protocol, etc.

In yet other embodiments, the data collector 150 determines each of the measured trip times 156 based on micro bi-direction forwarding detection ("mBFD"). The data collector 150 configures one of the endpoints to send a mBFD frame to the other endpoint. When the mBFD frame is sent, a timestamp T0 is automatically generated. Similarly, when a response is received from the other endpoint, a timestamp T1 is automatically generated. The data collector 150 sets the measured trip time 156 equal to T1 minus T0.

As persons skilled in the art will recognize, many other techniques exist for determining the measured trip times 156. Some examples of other techniques that the data collector 150 may use to determine the measured trip times 156 include, without limitation:

implementing a custom unicast User Datagram Protocol probe including, without limitation, embedded timing information, sequence info and lite crypto creating a full mesh Network Time Protocol system comparing timestamps provided by Google Network Management Interface measuring RTTs using Internet Engineering Task Force Two-Way Active Measurement Protocol measuring one way trip times using one-way ping In alternate embodiments, the data collector 150 may determine any amount and/or type of timing data associated with the circuit 122(1) over time in any technically feasible fashion. For instance, in one or more embodiments, the data collector 150 may configure one endpoint or both endpoints to stream any type of timing data to the data collector 150 in real-time.

After the data collector 150 generates the minimum measured trip time 158(1) during the first collection process, the monitoring application 140(1) generates a measured time series 162(1) that includes, without limitation, the minimum measured trip time 158(1). Subsequently, when the data collector 150 generates a new minimum measured trip time 158, the monitoring application appends the minimum measured trip time 158 to the measured time series 162(1).

As shown, the monitoring application 140(1) stores the measured time series 162(1) in the time series database 160. The time series database 160 is a database that is designed to operate on data that is associated with times or timestamps and is accessible to any number and type of software applications. Each of the software applications may perform any number and/or type of operations on the measured time series 162(1) to provide the user with any type of insight into the circuit 122(1). For example, in some embodiments, a graphing application displays a graph of the measured time series 162(1). In alternate embodiments, the monitoring application 140(1) may store the measured time series 162(1) in any database and/or any type of memory in any technically feasible fashion. In some alternate embodiments, the monitoring application 140(1) does not generate the measured time series 162(1).

The smoothing engine 170 performs one or more digital signal processing ("DSP") operations that reduce at least one variable delay included in the predicted trip time 158(*t*+1) to generate a predicted trip time 158(*t*+1). Each variable delay is a value for a type of telecommunications delay that varies over time. Some examples of types of telecommunications delays that vary over time include, without limitation, serialization delays, deserialization delays, queuing delays, and operating system delays, to name a few. An example of a variable delay attributable to an endpoint is a queuing delay that occurs when an endpoint enqueues a message behind other message(s).

In some embodiments, the predicted trip time 158(*t*+1) estimates a constant portion of the next minimum measured trip time 158(*t*+1). The constant portion of the next minimum measured trip time 158(*t*+1) includes, without limitation, delays attributable to the circuit 122(1) and constant delays attributable to the endpoints of the circuit 122(1), but does not include variable delays attributable to the endpoints.

Notably, in addition to taking into account the minimum measured trip time 158(*t*) when generating the predicted trip time 158(*t*+1), the behavior of the smoothing engine 170 may reflect any number of the minimum measured trip times 158(1)-158(*t*−1) and/or (as depicted with a dotted arrow) any number of the predicted trip times 178(1)-178(*t*). For instance, and as described in greater detail in conjunction with FIG. 2, in some embodiments, the smoothing engine 170 implements a Kalman filter. In some other embodiments, the smoothing engine 170 implements a proportional-integral-derivative ("PID") controller.

In alternate embodiments, the smoothing engine 170 may reduce variable delays that are included in the minimum measured trip time 158(*t*) in any technically feasible fashion to predict and/or estimate any type of trip time. For instance, in some alternate embodiments, the smoothing engine 170 may estimate the portion of the minimum measured trip time 158(*t*) that is attributable to the circuit 122(1) instead of predicting the constant portion of the minimum measured trip time 158(*t*+1).

As shown, after the smoothing engine 170 generates the predicted trip time 178(2) based on the first collection process, the monitoring application 140(1) generates a predicted time series 172(1) that includes, without limitation, the predicted trip time 178(2). Subsequently, when the smoothing engine 170 generates a new predicted trip time 178, the monitoring application appends the new predicted trip time 178 to the predicted time series 172(1). In alternate embodiments, the smoothing engine 170 may store the predicted time series 172(1) in any database (e.g., the time series database 160) and/or any type of memory in any technically feasible fashion.

As shown, the length engine 180 computes the circuit length 188(*t*+1) based on the predicted trip time 178(*t*+1). In alternate embodiments, the length engine 180 may compute any number of circuit lengths 188 based on any number and/or type of trip times (e.g., the predicted time series 172(1)). The length engine 180 may compute the circuit length 188(*t*+1) in any technically feasible fashion that is consistent with the predicted trip time 178(*t*+1). Notably, in one or more embodiments, the length engine 180 adjusts the predicted trip time 178(*t*+1) to eliminate constant delay(s) that are associated with the endpoints and/or the smoothing engine 170.

For instance, in one or more embodiments, the predicted trip times 178 are RTTs between two endpoints that are connected via a fiber optic cable. During an initialization phase, the length engine 180 determines a refractive index of the fiber optic cable and a constant delay value that represents a total estimated constant contribution of the two endpoints to each of the predicted trip times 178. The length engine 180 may determine the constant delay value and the refractive index of the fiber optic cable in any technically feasible fashion. For example, the length engine 180 could obtain the constant delay value and the refractive index based on input received from a user via a user interface (not shown). The user could determine the constant delay value based on empirical data and the refractive index based on a specification for the fiber optic cable.

Upon receiving the predicted trip time 178(*t*+1), the length engine 180 subtracts the constant delay value from the predicted trip time 178(*t*+1) and then divides the result by two to compute the one way propagation delay associated with the fiber optic cable. The length engine 180 then divides the speed of light in a vacuum (299,792,458 meters per second) by the refractive index of the fiber optic cable and multiplies the result by the one way propagation delay in seconds to compute the circuit length 188(*t*+1). For example, if the refractive index is 1.47 and the predicted trip times 178 are specified in microseconds, then the length engine 180 multiples the one way propagation delay by 0.204 to compute the circuit length 188(*t*+1) in kilometers.

After the length engine 180 computes the circuit length 188(2) corresponding to the first collection process, the monitoring application 140(1) generates a length time series 182(1) that includes, without limitation, the circuit length 188(2). Subsequently, when the length engine 180 generates a new circuit length 188, the monitoring application appends the circuit length 188 to the length time series 182(1).

In some alternate embodiments, the monitoring application 140 includes, without limitation, a circuit delay engine (not shown) in addition to or instead of the length engine 180. The circuit delay engine computes the delay associated with the circuit 122(1) based on the predicted trip time 178(*t*+1). The circuit delay engine may compute the delay associated with the circuit 122(1) in any technically feasible fashion. For example, and as descried previously in conjunction with the length engine 180, the circuit delay engine could adjust the predicted trip time 178(*t*+1) to eliminate constant delay(s) that are associated with the endpoints and/or the smoothing engine 170. The monitoring application 140 may then provide the delay associated with the circuit 122(1) to any number of software applications and/or store the delay associated with the circuit 122(1) in any type of memory in any technically feasible fashion.

The monitoring application 140 enables any number of software applications to access the circuit length 188(*t*+1) and/or the length time series 182 in any technically feasible fashion. For instance, in some embodiments, the smoothing engine 170 stores the circuit length 188(*t*+1) is stored in the time series database 160 that is accessible to any number of software applications. In the same or other embodiments, the smoothing engine 170 transmits the circuit length 188(*t*+1) and/or the length time series 182 to any number and/or type of software applications.

As shown, the monitoring application 140(1) stores the length time series 182(1) in the time series database 160. Subsequently, any number of software applications may access the length time series 182(1) and perform any number and any number and/or type of operations on the length time series 182(1) to provide the user with any number and/or types of insights into the circuit 122(1).

In alternate embodiments, the monitoring application 140(1) may store the length time series 182(1) in any database and/or any type of memory in any technically feasible fashion. In some alternate embodiments, the monitoring application 140(1) does not generate length time series 182(1). In the same or other alternate embodiments, the length engine 180 transmits any number of circuit lengths 188 to any number of software applications.

The change detector 190 analyzes the predicted time series 172(1) to determine whether the predicted trip time 178($t$+1) indicates that the delay associated with the circuit 122(1) has changed over time. If the change detector 190 determines that the predicted trip time 178($t$+1) indicates that the delay associated with the circuit 122(1) has changed over time, then the change detector 190 generates an alarm message 198 and transmits the alarm message 198 to any number and/or type of software applications.

As shown, the change detector 190 includes, without limitation, an anomaly criterion 192 and a slope 194. The anomaly criterion 192 specifies how the change detector 190 is to determine whether the predicted trip time 178($t$+1) indicates an anomaly in the delay associated with the circuit 122(1). The anomaly criterion 192 may specify any amount and/or type of data and/or operations in any technically feasible fashion. For example, the anomaly criterion 192 may include, without limitation, any number of rules, thresholds, algorithms, models, etc., in any combination.

The change detector 190 may determine the anomaly criterion 192 in any technically feasible fashion. In some embodiments, the change detector 190 determines at least a portion of the anomaly criterion 192 based on user input received via a user interface (not shown). In the same or other embodiments, the change detector 190 performs any number and type of operations on the predicted time series 172(1) to determine at least a portion of the anomaly criterion 192.

For instance, in some embodiments, the anomaly criterion 192 includes, without limitation, a deadband time window (not shown) that extends from a base trip time to a threshold trip time. In an initialization phase, the change detector 190 determines a deadband time based on user input received via the user interface. Upon receiving the predicted time series 172(1), the change detector 190 determines the base trip time based on the predicted trip times 178($t$+1-P)-178($t$+1) included in the predicted time series 172(1), where P may be any non-negative integer (including zero). For example, the change detector 190 could set the base trip time equal to the average of the predicted trip times 178($t$-3)-178($t$+1). The change detector 190 then sets the threshold trip time equal to the sum of the base trip time and the deadband time.

The change detector 190 may apply the anomaly criterion 192 to any portion of the predicted time series 172(1) in any technically feasible fashion. For instance, in some embodiments, the anomaly criterion 192 includes, without limitation the deadland time window described above. To determine whether the predicted trip time 178($t$+1) indicates a change in the delay associated with the circuit 122(1) over time, the change detector 190 compares the predicted trip times 178($t$+1-Q)-178($t$+1) to the deadband time window, where Q may be any non-negative integer (including zero). For example, if Q is equal to zero, then the change detector compares the predicted trip time 178($t$+1) to the deadband time window.

If all of the predicted trip times 178($t$+1-Q)-178($t$+1) lie within the deadband time window, then the change detector 190 determines that the predicted trip time 178($t$+1) does not indicate a change in the delay associated with the circuit 122(1) over time. Otherwise, the change detector 190 determines that the predicted trip time 178($t$+1) indicates a change in the delay associated with the circuit 122(1) over time.

If the change detector 190 determines that the predicted trip time 178($t$+1) indicates a change in the delay associated with the circuit 122(1) over time, then the change detector 190 computes the slope 194 associated with the anomaly based on the predicted time series 172(1). The change detector 190 may compute the slope 194 in any technically feasible fashion. For instance, in some embodiments, the change detector computes the slope 194 between the predicted trip time 178($t$+1) and the base trip time. If the slope 194 is positive, then the change detector 190 generates the alarm message 198 indicating that the length of the circuit 122(1) has increased. Otherwise, the change detector 190 generates the alarm messages 198 indicating the that length of the circuit 122(1) has decreased. The change detector 190 then transmits the alarm message 198 to any number of software applications.

In some alternate embodiments, the change detector 190 detects anomalies in the circuit 122(1) and/or generates the alarm message 198 based on any amount and type of data instead of or in addition to the predicted time series 172(1). For instance, in some embodiments, the change detector 190 detects anomalies in the circuit 122(1) based on the predicted trip time 178($t$+1) but not any of the other predicted trip times 178 included in the predicted time series 172(1). In the same or other embodiments, the change detector 190 acquires the circuit length 188($t$+1) from the length engine 180 and specifies the circuit length 188($t$+1) in the alarm message 198 instead of or in addition to computing the slope 194.

In some alternate embodiments, the change detector 190 and/or the monitoring application 140(1) implement any number and/or type of tuning operations to detect anomalies in the circuit 122(1). For instance, in one or more alternate embodiments, the change detector 190 performs any number of fast Fourier transform operations on any amount and/or type of trip data to detect anomalies associated with periodicity. In the same or other alternate embodiments, the change detector 190 performs any number of integration operations on any amount and/or type of trip data to sum event time(s) associated with any type of anomaly. In the same or other alternate embodiments, the change detector 190 performs any number of derivative operations on any amount and/or type of trip data to detect anomalies that are sensitive to rates of change.

As noted previously herein, each of the monitoring applications 140(1)-140(N) is a different instance of the single monitoring application 140 that is configured to monitor the circuits 122(1)-122(N). As part of monitoring the circuit 122($x$), where x is an integer from 1 to N, the monitoring application 140($x$) stores the measured time series 162($x$) and the length time series 182($x$) in the time series database 160. In alternate embodiments, the monitoring application 140($x$) may store any amount and/or type of data in any number and/or types of memories in any technically feasible fashion instead of or in addition to storing the measured time series 162($x$) and the length time series 182($x$) in the time series database 160. For instance, in some alternate embodiments, the monitoring application 140($x$) stores the measured time series 162($x$) and/or the length time series 182($x$) in the memory 116 of the compute instance 110 instead of the time series database 160.

Each of the monitoring applications 140(1)-140(N) continues to monitor and analyze the associated circuits 122(1)-122(N), respectively, until determining that the associated monitoring task is complete. Each of the monitoring applications 140 may determine that the associated monitoring process is complete in any technically feasible fashion. For instance, in some embodiments, each of the monitoring applications 140 determine that the monitoring task is complete when the network analysis subsystem 130, the compute instance 110, or the user ends the monitoring task. For example, the user could close a browser that is executing the network analysis subsystem 130.

In some embodiments, the network analysis subsystem 130 updates the network graph 132 to reflect changes in the network 120 based on any number and/or types of triggers and/or criteria. For instance, in one or more embodiments, the network analysis subsystem 130 receives a state feed from a live streaming telemetry system (not shown) that specifies, without limitation, events that change the topology of the network 120. Some examples of events that change the topology of the network 120 includes, without limitation, link up/down events, neighbor adjacency events, network configuration events, etc. If the state feed indicates that the topology of the network 120 has changed, then the network analysis subsystem 130 modifies the network graph 132 to reflect the new topology, terminates the instance of the monitoring application 140 associated with each of the circuits 122 that no longer exist, and executes a new instance of the monitoring application 140 for each new circuit 122.

Advantageously, by automatically reducing variations in the minimum measured trip times 158 that are attributable to endpoints, the monitoring application 140 enables users to accurately assess delays associated with the circuits 122 within the network 120. Unlike prior art techniques, the monitoring application 140 can accurately compute the delays associated with the circuits 122 and/or any number of characteristics of each delay irrespective of the lengths and locations of the endpoints of the circuits 122. Some examples of characteristics of the delay associated with a given circuit 122 include, without limitation, changes in the delay associated with the circuit 122, changes in the delay associated with the circuit 122, and the length of the circuit 122, In some embodiments, any number of users can improve one or more aspects of the network 120 and/or how the network 120 is used based on the alarm message 198. For example, a user could determine that the telecommunications provider re-groomed the circuit 122(1) to an alternate path that shares a conduit with the circuit 122(N) to address a technical problem. The user could subsequently determine that the telecommunications provider failed to re-groom the circuit 122(1) back to the original path when the technical problem was resolved. The physical proximity of the circuits 122(1) and 122(N) could increase the likelihood that the circuits 122(1) and 122(N) would share the same fate in a failure scenario. To reduce the potential negative impact of the failure scenario, the user could request the restoration of the circuit 122(1) to the original path.

Note that the techniques described herein are illustrative rather than restrictive and may be altered without departing from the broader spirit and scope of the invention. Many modifications and variations on the functionality provided by the network analysis subsystem 130, the monitoring application 140, the data collector 150, the smoothing engine 170, the length engine 180, and the change detector 190 will be apparent to those of ordinary skill in the art without departing from the scope and spirit of the described embodiments.

It will be appreciated that the system 100 shown herein is illustrative and that variations and modifications are possible. The connection topology, including the location and arrangement of the compute instance 110, the network 120, the time series database 160, the network analysis subsystem 130, the monitoring application 140, the data collector 150, the smoothing engine 170, the length engine 180, and the change detector 190 may be modified as desired. In certain embodiments, one or more components shown in FIG. 1 may not be present. For instance, in some alternate embodiments, the length engine 180 and/or the length time series 182(1)-182(N) may be omitted from the system 100.

In some embodiments, any portion of the functionality provided by the network analysis subsystem 130, the monitoring application 140, the data collector 150, the smoothing engine 170, the length engine 180, and the change detector 190 as described herein may be integrated into or distributed across any number of software applications (including one) and any number of compute instances 110 (including one).

Smoothing Trip Times Using a Kalman Filter

Figure 2:
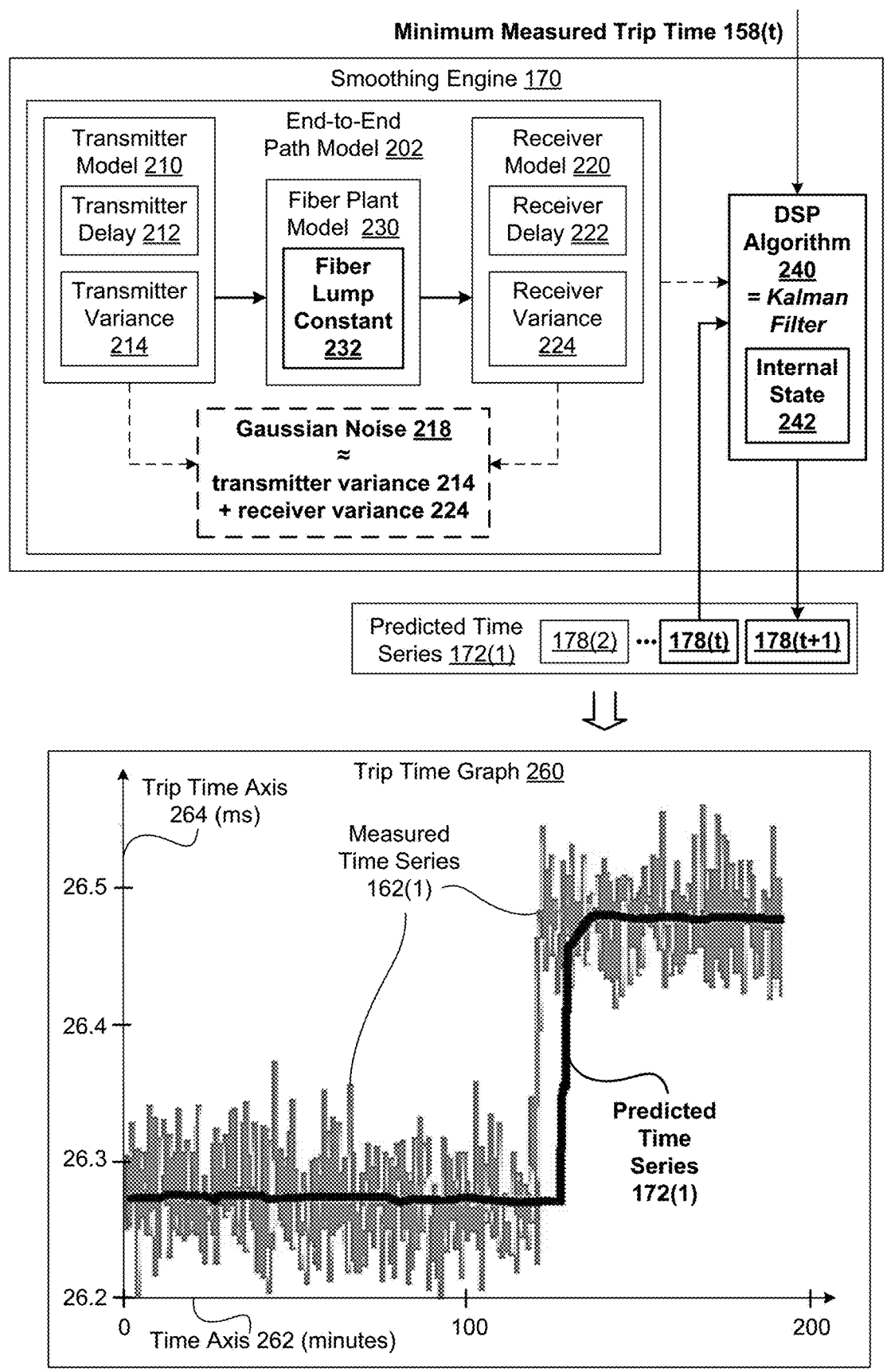
FIG. 2 is a more detailed illustration of the smoothing engine of FIG. 1, according to various embodiments.

FIG. 2 is a more detailed illustration of the smoothing engine 170 of FIG. 1, according to various embodiments. Referring to FIG. 1 and for explanatory purposes only, the smoothing engine 170 is associated with the circuit 122(1) and receives the minimum measured trip time 158($t$) corresponding to the time index 154 of t from the data collector 150.

As shown, the smoothing engine 170 includes, without limitation, an end-to-end path model 202 and a DSP algorithm 240 for a Kalman filter that is associated with the end-to-end path model 202. The end-to-end path model 202 describes how two endpoints (not shown) that are connected via a fiber plant (not shown) and the fiber plant itself contribute to a one way trip time for an associated circuit 122. Each of the endpoints may be any type of device that is capable of receiving and transmitting data via the associated circuit 122, such as a router. In alternate embodiments, the smoothing engine 170 may include any number (including zero) and/or type of models that are associated with the circuits 122 and/or the DSP algorithm 240 in any technically feasible fashion.

For explanatory purposes only, a "trip time" as used herein may refer to any portion (including all) of a one way trip time or any portion (including all) of an RTT. Some examples of trip times include, without limitation, the measured trip times 156, the minimum measured trip times 158, the predicted trip times 178, and the one way trip time associated with the end-to-end path model 202.

The fiber plant includes, without limitation, the physical infrastructure that implements the associated circuit 122. For instance, in one or more embodiments, the fiber plant includes, without limitation, a fiber optic cable, any number of optical components, and any number of physical support structures. Notably, in some embodiments, trip times are associated with an optical path instead of a physical path or easement path that is typically specified by a telecommunications provider. As persons skilled in the art will recognize, because the optical path includes any number of optical components that introduce delay, for any given circuit 122, the optical path is typically longer than the physical path.

As shown, the end-to-end path model 202 includes, without limitation, a fiber plant model 230, a transmitter model 210, a receiver model 220, and Gaussian noise 218. The fiber plant model 230 includes, without limitation, a fiber lump constant 232 that represents a total contribution of the circuit 122 to the one way trip time. Importantly, the fiber lump constant 232 does not change unless the length of the circuit 122 changes. Consequently, the fiber plant model 230 does not include any variance.

The transmitter model 210 represent an endpoint and includes, without limitation, a transmitter delay 212 and a transmitter variance 214. The transmitter delay 212 is a total delay that includes, without limitation, any amount and type of delays associated with pre-processing data for transmission via the circuit 122. For instance, in one or more embodiments, the transmitter delay 212 includes, without limitation, serialization delays, queuing delays, operating system delays, etc. The transmitter variance 214 is a variance associated with the transmitter delay 212 and is therefore attributable to the associated endpoint when the endpoint is transmitting data.

The receiver model 220 represent an endpoint and includes, without limitation, a receiver delay 222 and a receiver variance 224. The receiver delay 222 is a total delay that includes, without limitation, any amount and type of delays associated with post-processing data received via the circuit 122. For instance, in one or more embodiments, the receiver delay 222 includes, without limitation, deserialization delays, queuing delays, operating system delays, etc. The receiver variance 224 is a variance associated with the receiver delay 222 and is therefore attributable to the associated endpoint when the endpoint is receiving data.

The Gaussian noise 218 approximates the sum of the transmitter variance 214 and the receiver variance 224. Approximating the sum of the transmitter variance 214 and the receiver variance 224 as the Gaussian noise 218 facilitates automatically reducing the variance in the minimum measured trip times 158 over time via the DSP algorithm 240 of the Kalman filter. As persons skilled in the art will recognize, the Kalman filter for a given system is configured based on a model of a system to recursively predict next measurement(s) of variable(s) associated with the system based on measurements of the variable(s) over time. As part of predicting the next measurement(s), the Kalman filter reduces or "filters out" noise associated with the variable(s) and updates an internal state 242.

As shown, the DSP algorithm 240 is a Kalman filter that is configured based on the end-to-end path model 202 to generate the predicted trip time 178($t$+1) based on the minimum measured trip time 158($t$) and the predicted trip time 178($t$) and then update the internal state 242. Because the transmitter variance 214 and the receiver variance 224 are modeled as the Gaussian noise 218, the DSP algorithm 240 (e.g., the Kalman filter) treats the transmitter variance 214 and the receiver variance 224 as noise and approximates the associated distributions as being equal to Gaussian distributions. Consequently, the DSP algorithm 240 automatically reduces variances associated with the minimum measured trip time 158($t$) that are attributable to the endpoints when generating the predicted trip time 178($t$+1).

In some embodiments, the monitoring application 140(1) inputs the minimum measured trip time 158($t$) into the Kalman filter and, in response, the Kalman filter outputs the predicted trip time 178($t$+1). As described previously in conjunction with FIG. 1, after the smoothing engine 170 computes the predicted trip time 178($t$+1), the monitoring application 140(1) appends the predicted trip time 178($t$+1) to the predicted time series 172(1).

As shown, after the monitoring application 140(1) appends the predicted trip time 178($t$+1) to the predicted time series 172(1), the predicted time series 172(1) includes, without limitation, the predicted trip times 178(2)-178($t$+1). The Kalman filter, the smoothing engine 170 and/or the monitoring application 140(1) may determine the predicted trip time 178(1) that the Kalman filter uses in conjunction with the minimum measured trip time 158(1) to generate the predicted trip time 178(2) in any technically feasible fashion. In some alternate embodiments, the monitoring application 140(1) adds the predicted trip time 178(1) to the predicted time series 172(1).

For explanatory purposes only, the predicted time series 172(1) and the measured time series 162(1) are graphically depicted in a trip time graph 260 that includes, without limitation a time axis 262 that specifies minutes and a trip time axis 264 that specifies milliseconds ("ms"). Each of the predicted trip times 178 included in the predicted time series 172(1) is depicted as a black line that has a horizontal position corresponding to the associated time index 154 along the time axis 262 and a vertical position corresponding to the predicted trip time 178 along the trip time axis 264. Each of the minimum measured trip times 158 included in the measured time series 162(1) is depicted as a grey line that has a horizontal position corresponding to the associated time index 154 along the time axis 262 and a vertical position corresponding to the predicted trip time 178 along the trip time axis 264.

Advantageously, as the trip time graph 260 illustrates, over time the smoothing engine 170 incrementally generates the predicted time series 172(1) that is a smoothed version of the measured time series 162(1). Furthermore, the smoothing engine 170 preserves the contribution of the fiber lump constant 232 representing the propagation delay associated with the circuit 122(1) to the predicted trip times 178. Accordingly, when the length of the circuit 122(1) increases at approximately 120 minutes, the predicted time series 172(1) adjusts to reflect the increase at approximately 124 minutes.

In some alternate embodiments, the smoothing engine 170 may operate on any amount and/or type of timing data associated with the circuit 122(1) instead of the minimum measured trip time 158($t$). In the same or other alternate embodiments, the smoothing engine 170 may generate and amount and/or type of timing data instead of the predicted trip time 178($t$+1).

In alternate embodiments, the smoothing engine 170 may implement any type of DSP algorithm 240 instead of or in addition to implementing the Kalman filter. For instance, in some alternate embodiments, the smoothing engine 170 implements a DSP algorithm for a PID controller instead of the Kalman filter. For example, the monitoring application 140(1) could input the minimum measured trip time 158($t$) into the PID controller and, in response, the PID controller could output the predicted trip time 178($t$+1).

In some alternate embodiments, the smoothing engine 170 may execute any number and/or type of DSP operations and/or any number and/or type of other operations instead of or in addition to implementing the DSP algorithm 240. For example, the smoothing engine 170 could execute any number and type of control operations, linear quadratic estimation operations, thresholding operations, filtering operations, scaling operations, and/or any other mathematical operations in any combination. In another example, the smoothing engine 170 could execute any number of operations based on at least a portion of a Kalman filter and/or any number of operations based on at least a portion of a PID controller. In the same or other alternate embodiments, the smoothing engine 170 and/or the DSP algorithm 240 may implement any number and/or type of tuning operations that facilitate adjustments to reflect any type of changes (e.g., environmental impacts) associated with the associated circuit 122.

In some alternate embodiments, the smoothing engine 170 may implement any number and/or type or initialization operations to increase the efficiency, number, and/or type of DSP operations. In the same or other alternate embodiments, the smoothing engine 170 may implement a "hold-over" value for the minimum measured trip times 158 when the associated circuit 122 is considered to be out-of-service (e.g., during maintenance periods) to avoid skewing the predicted trip times 178.

For instance, in some alternate embodiments, the smoothing engine 170 precharges the Kalman filter via an initial value and/or a precharge multiplication factor for the minimum measured trip time 158(t) to increase the rate at which the Kalman filter converges. The smoothing engine 170 may determine any type of precharge multiplication factor in any technically feasible fashion. For example, the precharge multiplication factor could be a constant value (e.g., 1.2), a fractional multiplication factor (e.g., the derivative of the minimum measured trip time 158(t) with respect to the predicted trip time 178(t)), etc. In some alternate embodiments, the smoothing engine 170 initially mutes the predicted trip time 178(t+1) to reduce skew introduced by initialization value and/or the precharge multiplication factor.

Figure 3:
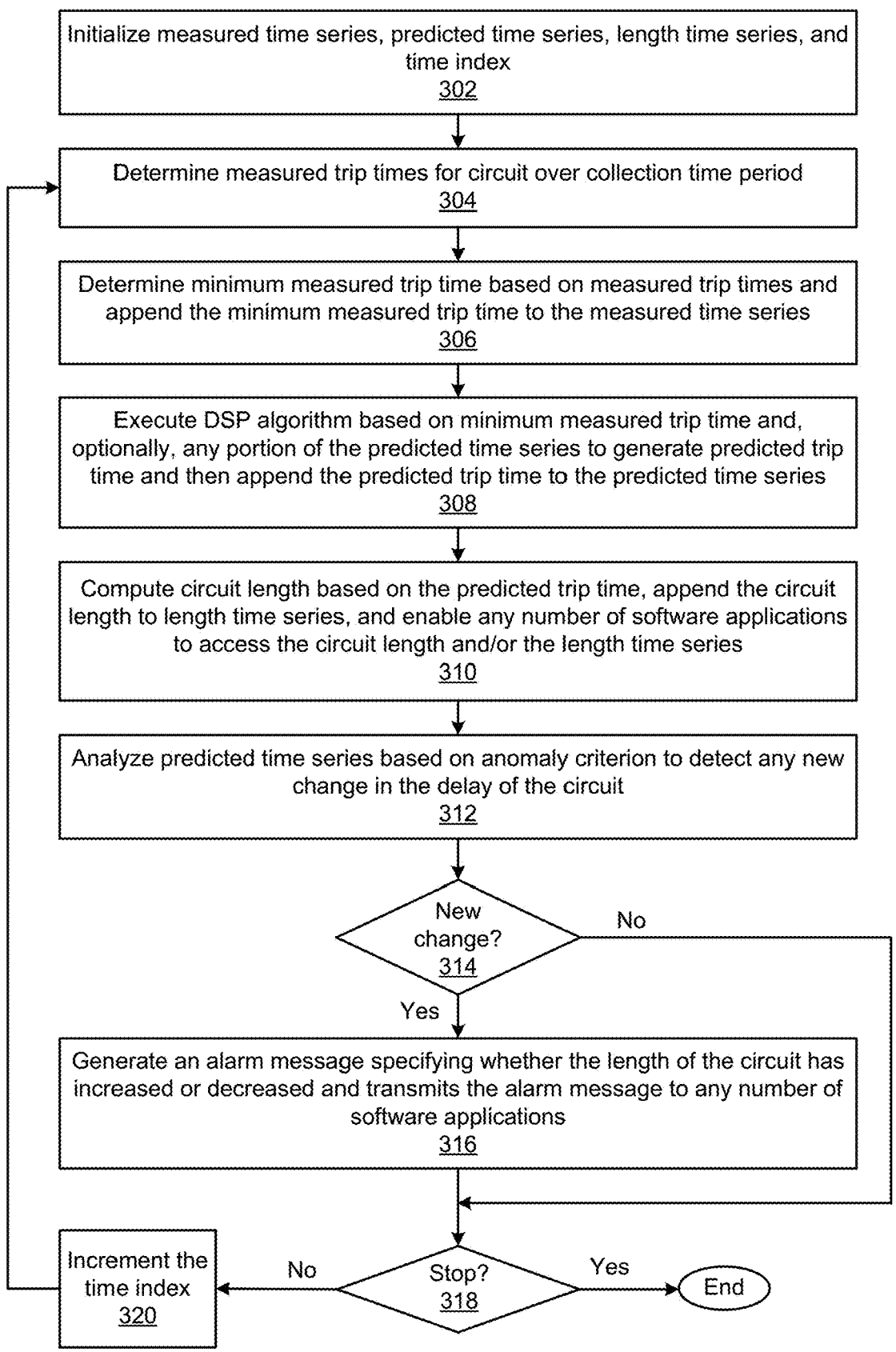
FIG. 3 is a flow diagram of method steps for understanding the delay associated with a circuit, according to various embodiments.

FIG. 3 is a flow diagram of method steps for understanding the delay associated with a circuit, according to various embodiments. Although the method steps are described with reference to the systems of FIGS. 1-2, persons skilled in the art will understand that any system configured to implement the method steps, in any order, falls within the scope of the present invention.

As shown, a method 300 begins a step 302, where the monitoring application 140 initializes the measured time series 162, the predicted time series 172, the length time series 182, and the time index 154 (denoted as t). At step 304, the data collector 150 determines the measured trip times 156(1)-156(S) over the collection time period 152. At step 306, the data collector 150 determines the minimum measured trip time 158(t) for the associated circuit 122 based on the measured trip times 156(1)-156(S). The monitoring application 140 then appends the minimum measured trip time 158(t) to the measured time series 162.

At step 308, the smoothing engine 170 executes the DSP algorithm 240 based on the minimum measured trip time 158(t) and, optionally, any portion of the predicted time series 172 to generate the predicted trip time 178(t+1). The monitoring application 140 then appends the predicted trip time 178(t+1) to the predicted time series 172. At step 310, the length engine 180 computes the circuit length 188(t+1) based on the predicted trip time 178(t+1) and the monitoring application 140 appends the circuit length 188(t+1) to the length time series 182. The monitoring application 140 enables any number of software applications to access the circuit length 188(t+1) and/or the length time series 182 in any technically feasible fashion. For instance, in some embodiments, the smoothing engine 170 stores the circuit length 188(t+1) is stored in the time series database 160 that is accessible to any number of software applications.

At step 312, the change detector 190 analyzes the predicted time series 172 based on the anomaly criterion 192 to detect any new change in the delay associated with the circuit 122. At step 314, if the change detector 190 has not detected a new change in the delay associated with the circuit 122, then the method 300 proceeds directly to step 316.

If, however, at step 314, the change detector 190 has not detected a new change in the delay associated with the circuit 122, then the method 300 proceeds to step 316. At step 316, the change detector 190 generates the alarm message 198 based on whether the length of the circuit 122 has increased or decreased and transmits the alarm message 198 to any number of software applications.

At step 318, the monitoring application 140 determines whether to stop monitoring the circuit 122. The monitoring application 140 may determine whether the stop monitoring the circuit 122 in any technically feasible fashion. For instance, in some embodiments, the monitoring application 140 determines to stop monitoring the circuit 122 when the monitoring application 140 receives an exit command from the network analysis subsystem 130. If, at step 318, the monitoring application 140 determines to stop monitoring the circuit 122, then the method 300 terminates.

If, however, at step 318, the monitoring application 140 does not determine to stop monitoring the circuit 122, then the method 300 proceeds to step 320. At step 320, the monitoring application 140 increments the time index 154. The method 300 then returns to step 304, where the data collector 150 determines a new set of measured trip times 156(1)-156(S) over the collection time period 152. The method 300 continues to cycle through steps 304-320 until the monitoring application 140 determines, at step 318, to stop monitoring the circuit 122.

In sum, the disclosed techniques can be used to accurately assess the delays associated with circuits within a telecommunications network over time. In some embodiments, a network analysis subsystem generates a network graph representing a telecommunications network. For each circuit in the network graph, the network analysis subsystem executes a separate instance of a monitoring application. The monitoring application includes, without limitation, a data collector, a smoothing engine, a length engine, and a change detector. For each collection time period (e.g., one minute) while the associated circuit operates, the data collector measures the measured trip times multiple times and selects the minimum measured trip time for the collection time period from the measured trip times. The monitoring application then stores the minimum measured trip time in a measured time series.

After each collection time period, the smoothing engine executes a Kalman filter based on the minimum measured trip time for the collection time period and the predicted trip time for the collection time period to generate a predicted trip time for the next collection time period. The Kalman filter is associated with an end-to-end path model that describes how two endpoints that are connected via a circuit contribute to one way trip times for the circuit. More precisely, the end-to-end path model represents the contribution of the circuit to a one way trip time as a constant value and the contributions of each network device to the trip times as constant values and associated variances that resemble Gaussian noise. Importantly, the Kalman filter reduces the contribution of the variances to the minimum measured trip time for the collection time period when generating the predicted trip time for the next collection time period. The monitoring application then adds the predicted trip time to a predicted time series.

The length engine computes a circuit length based on the predicted trip time, and the monitoring application stores the circuit length in a length time series that is accessible to any number and type of software applications. The change engine analyzes the predicted time series based on an anomaly criterion to determine whether the predicted trip time indicates a new change in the delay associated with circuit. If the change engine determines that the predicted trip time indicates a new change in the delay associated with the circuit, then the change engine transmits an alarm message indicating whether the length of the circuit has increased or decreased to any number of software applications. Each instance of the circuit analysis application continues to operate until the network analysis subsystem determines that the associated circuit is no longer represented in the network graph or the network analysis subsystem terminates.

At least one technological improvement of the disclosed techniques relative to the prior art is that the monitoring application automatically smooths-out variations in measured trip times that are not attributable to the circuit itself prior to assessing the circuit. As a result, the monitoring application can accurately determine the delay, the length, and any changes associated with the circuit irrespective of the length of the circuit or the locations of the endpoints of the circuit. In particular, the monitoring application filters-out variances in the delays associated with endpoints that can reduce the accuracy of some prior art techniques when assessing circuits that are less than approximately fifty kilometers in length. Furthermore, unlike some other prior art techniques that rely on dedicated hardware probes, the monitoring application can assess circuits having endpoints that are not physically accessible to the user. These technical advantages provide one or more technological advancements over prior art approaches.

1. In some embodiments, a computer-implemented method for assessing delays associated with a circuit included in a network comprises determining a measured trip time between a first device within the network and a second device within the network, wherein the first device is connected to the second device via the circuit, and wherein the measured trip time is associated with a first variance attributable to the first device, performing one or more digital signal processing operations based on the measured trip time to generate a first predicted trip time that is associated with a second variance attributable to the first device, wherein the second variance is less than the first variance, and determining at least one characteristic of a delay associated with the circuit based on the first predicted trip time.

2. The computer-implemented method of clause 1, wherein determining the at least one characteristic of the delay associated with the circuit comprises generating a time series that includes the first predicted trip time and at least a second predicted trip time associated with the circuit, and determining that the delay associated with the circuit has changed over time based on the time series and an anomaly criterion.

3. The computer-implemented method of clauses 1 or 2, further comprising transmitting an alarm message specifying that a length of the circuit has changed to one or more software applications.

4. The computer-implemented method of any of clauses 1-3, wherein determining the at least one characteristic of the delay associated with the circuit comprises computing a length of the circuit based on the first predicted trip time and at least one constant delay value that is associated with at least one of the first device or the second device.

5. The computer-implemented method of any of clauses 1-4, wherein performing the one or more digital signal processing operations comprises inputting the measured trip time into a Kalman filter that, in response, outputs the first predicted trip time.

6. The computer-implemented method of any of clauses 1-5, wherein the second variance has a value of zero.

7. The computer-implemented method of any of clauses 1-6, wherein performing the one or more digital signal processing operations comprises executing at least one of a control operation, a linear quadratic estimation operation, a filtering operation, an operation based on at least a portion of a Kalman filter, or an operation based on at least a portion of a proportional-integral-derivative controller.

8. The computer-implemented method of any of clauses 1-7, wherein determining the measured trip time comprises executing a ping command that returns the measured trip time or reading the measured trip time from a Transmission Control Protocol Transmission Control Block associated with the circuit.

9. The computer-implemented method of any of clauses 1-8, wherein the first device comprises a router, a laptop, a smartphone, a smart television, or a game console.

10. The computer-implemented method of any of clauses 1-9, wherein the circuit comprises a fiber optic cable.

11. In some embodiments, one or more non-transitory computer readable media include instructions that, when executed by one or more processors, cause the one or more processors to assess delays associated with a circuit included in a network by performing the steps of determining a measured trip time between a first device within the network and a second device within the network, wherein the first device is connected to the second device via the circuit, performing one or more digital signal processing operations that reduce a first variance associated with the measured trip time to generate a first predicted trip time, wherein the first variance is attributable to at least one of the first device or the second device, and determining at least one characteristic of a delay associated with the circuit based on the first predicted trip time.

12. The one or more non-transitory computer readable media of clause 11, wherein determining the at least one characteristic of the delay associated with the circuit comprises generating a time series that includes the first predicted trip time and at least a second predicted trip time associated with the circuit, and determining that the delay associated with the circuit has changed over time based on the time series and an anomaly criterion.

13. The one or more non-transitory computer readable media of clauses 11 or 12, further comprising determining that a length of the circuit has increased based on the time series, and transmitting an alarm message specifying that the length of the circuit has increased to one or more software applications.

14. The one or more non-transitory computer readable media of any of clauses 11-13, wherein determining the at least one characteristic of the delay associated with the circuit comprises computing a length of the circuit based on the first predicted trip time and at least one constant delay value that is associated with at least one of the first device or the second device.

15. The one or more non-transitory computer readable media of any of clauses 11-14, wherein performing the one or more digital signal processing operations comprises inputting the measured trip time into a Kalman filter that, in response, outputs the first predicted trip time.

16. The one or more non-transitory computer readable media of any of clauses 11-15, wherein the Kalman filter approximates a distribution associated with the first variance as being equal to a Gaussian distribution.

17. The one or more non-transitory computer readable media of any of clauses 11-16, wherein performing the one or more digital signal processing operations comprises inputting the measured trip time into a proportional-integral-derivative controller that, in response, outputs the first predicted trip time.

18. The one or more non-transitory computer readable media of any of clauses 11-17, wherein determining the measured trip time comprises executing a ping command that returns the measured trip time or reading the measured trip time from a Transmission Control Protocol Transmission Control Block associated with the circuit.

19. The one or more non-transitory computer readable media of any of clauses 11-18, wherein the circuit comprises a fiber optic cable.

20. In some embodiments, a system comprises one or more memories storing instructions and one or more processors coupled to the one or more memories that, when executing the instructions, perform the steps of determining a measured trip time between a first device within a network and a second device within the network, wherein the first device is connected to the second device via a circuit, and wherein the measured trip time is associated with a first variance attributable to the first device, performing one or more digital signal processing operations based on the measured trip time to generate a predicted trip time that is associated with a second variance attributable to the first device, wherein the second variance is less than the first variance, and determining at least one of a delay associated with the circuit, a change in the delay associated with the circuit, or a length of the circuit based on the predicted trip time.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for assessing delays associated with a circuit included in a network, the method comprising:
    determining a measured trip time between a first device within the network and a second device within the network, wherein the first device is connected to the second device via the circuit, and wherein the measured trip time is associated with a first variance attributable to the first device;
    performing one or more digital signal processing operations based on the measured trip time to generate a first predicted trip time that is associated with a second variance attributable to the first device, wherein the second variance is less than the first variance; and determining at least one characteristic of a delay associated with the circuit based on the first predicted trip time.

2. The computer-implemented method of claim 1, wherein determining the at least one characteristic of the delay associated with the circuit comprises:
  generating a time series that includes the first predicted trip time and at least a second predicted trip time associated with the circuit; and
  determining that the delay associated with the circuit has changed over time based on the time series and an anomaly criterion.

3. The computer-implemented method of claim 2, further comprising transmitting an alarm message specifying that a length of the circuit has changed to one or more software applications.

4. The computer-implemented method of claim 1, wherein determining the at least one characteristic of the delay associated with the circuit comprises computing a length of the circuit based on the first predicted trip time and at least one constant delay value that is associated with at least one of the first device or the second device.

5. The computer-implemented method of claim 1, wherein performing the one or more digital signal processing operations comprises inputting the measured trip time into a Kalman filter that, in response, outputs the first predicted trip time.

6. The computer-implemented method of claim 1, wherein the second variance has a value of zero.

7. The computer-implemented method of claim 1, wherein performing the one or more digital signal processing operations comprises executing at least one of a control operation, a linear quadratic estimation operation, a filtering operation, an operation based on at least a portion of a Kalman filter, or an operation based on at least a portion of a proportional-integral-derivative controller.

8. The computer-implemented method of claim 1, wherein determining the measured trip time comprises executing a ping command that returns the measured trip time or reading the measured trip time from a Transmission Control Protocol Transmission Control Block associated with the circuit.

9. The computer-implemented method of claim 1, wherein the first device comprises a router, a laptop, a smartphone, a smart television, or a game console.

10. The computer-implemented method of claim 1, wherein the circuit comprises a fiber optic cable.

11. One or more non-transitory computer readable media including instructions that, when executed by one or more processors, cause the one or more processors to assess delays associated with a circuit included in a network by performing the steps of:
  determining a measured trip time between a first device within the network and a second device within the network, wherein the first device is connected to the second device via the circuit;
  performing one or more digital signal processing operations that reduce a first variance associated with the measured trip time to generate a first predicted trip time, wherein the first variance is attributable to at least one of the first device or the second device; and
  determining at least one characteristic of a delay associated with the circuit based on the first predicted trip time.

12. The one or more non-transitory computer readable media of claim 11, wherein determining the at least one characteristic of the delay associated with the circuit comprises:
  generating a time series that includes the first predicted trip time and at least a second predicted trip time associated with the circuit; and
  determining that the delay associated with the circuit has changed over time based on the time series and an anomaly criterion.

13. The one or more non-transitory computer readable media of claim 12, further comprising:
  determining that a length of the circuit has increased based on the time series; and
  transmitting an alarm message specifying that the length of the circuit has increased to one or more software applications.

14. The one or more non-transitory computer readable media of claim 11, wherein determining the at least one characteristic of the delay associated with the circuit comprises computing a length of the circuit based on the first predicted trip time and at least one constant delay value that is associated with at least one of the first device or the second device.

15. The one or more non-transitory computer readable media of claim 11, wherein performing the one or more digital signal processing operations comprises inputting the measured trip time into a Kalman filter that, in response, outputs the first predicted trip time.

16. The one or more non-transitory computer readable media of claim 15, wherein the Kalman filter approximates a distribution associated with the first variance as being equal to a Gaussian distribution.

17. The one or more non-transitory computer readable media of claim 11, wherein performing the one or more digital signal processing operations comprises inputting the measured trip time into a proportional-integral-derivative controller that, in response, outputs the first predicted trip time.

18. The one or more non-transitory computer readable media of claim 11, wherein determining the measured trip time comprises executing a ping command that returns the measured trip time or reading the measured trip time from a Transmission Control Protocol Transmission Control Block associated with the circuit.

19. The one or more non-transitory computer readable media of claim 11, wherein the circuit comprises a fiber optic cable.

20. A system comprising:
  one or more memories storing instructions; and
  one or more processors coupled to the one or more memories that, when executing the instructions, perform the steps of:
    determining a measured trip time between a first device within a network and a second device within the network, wherein the first device is connected to the second device via a circuit, and wherein the measured trip time is associated with a first variance attributable to the first device;
    performing one or more digital signal processing operations based on the measured trip time to generate a predicted trip time that is associated with a second variance attributable to the first device, wherein the second variance is less than the first variance; and determining at least one of a delay associated with the circuit, a change in the delay associated with the circuit, or a length of the circuit based on the predicted trip time.

\* \* \* \* \*